United States Patent [19]
Kiel

[11] 3,710,865
[45] Jan. 16, 1973

[54] METHOD OF FRACTURING SUBTERRANEAN FORMATIONS USING OIL-IN-WATER EMULSIONS

[75] Inventor: Othar M. Kiel, Houston, Tex.

[73] Assignee: Esso Production Research Company

[22] Filed: May 24, 1971

[21] Appl. No.: 146,349

Related U.S. Application Data

[63] Continuation-in-part of Ser. No. 76,887, Sept. 30, 1970, abandoned.

[52] U.S. Cl.............166/308, 166/283, 252/8.55 R
[51] Int. Cl. ...........................................E21b 43/26
[58] Field of Search............166/283, 280, 308, 275; 252/8.55 R

[56] References Cited

UNITED STATES PATENTS

| | | | |
|---|---|---|---|
| 2,742,426 | 4/1956 | Brainerd, Jr. | 166/283 X |
| 2,793,998 | 5/1957 | Brainerd, Jr. | 252/8.55 R |
| 2,801,218 | 7/1957 | Menaul | 252/8.55 R |
| 2,802,531 | 8/1957 | Cardwell et al. | 166/308 X |
| 2,876,839 | 3/1959 | Fast et al. | 166/283 |
| 2,935,129 | 5/1960 | Allen et al. | 166/283 X |
| 3,305,016 | 2/1967 | Lindblom et al. | 166/275 X |
| 3,405,062 | 10/1968 | Kuhn | 166/283 X |
| 3,442,803 | 5/1969 | Hoover et al. | 252/8.55 R |
| 3,552,494 | 1/1971 | Kiel | 166/308 |

OTHER PUBLICATIONS

Rosen et al., "New Fracturing Fluid Uses Lease Crude," The Oil & Gas Journal, Jan. 3, 1955, pp. 105-106.

Primary Examiner—Stephen J. Novosad
Attorney—James A. Reilly, John B. Davidson, Lewis H. Eatherton, James E. Gilchrist, Robert L. Graham and James E. Reed

[57] ABSTRACT

A fracturing method wherein an improved oil-in-water emulsion is injected into a subterranean formation under sufficient pressure to open a fracture in the formation and constituents of the emulsion are thereafter produced from the formation. The emulsion contains a major volume proportion of an internal liquid hydrocarbon phase and a minor volume proportion of an external water phase containing a water-dispersible polymeric thickening agent in a concentration sufficient to provide the water phase with an apparent viscosity of at least 10 centipoises at 70° F and a shear rate of 511 reciprocal seconds. The emulsion is formulated so that the internal oil phase constitutes more than 50 but not more than about 80 volume percent, and preferably between about 60 and about 75 volume percent, of the emulsion.

34 Claims, 9 Drawing Figures

INVENTOR.
OTHAR M. KIEL

BY *Robert L. Graham*

ATTORNEY

INVENTOR.
OTHAR M. KIEL

BY Robert L. Graham

ATTORNEY

METHOD OF FRACTURING SUBTERRANEAN FORMATIONS USING OIL-IN-WATER EMULSIONS

CROSS-REFERENCE TO RELATED APPLICATION

This application is a continuation-in-part of application Ser. No. 76,887, filed in the U.S. Pat. Office on Sept. 30, 1970, now abandoned.

BACKGROUND OF THE INVENTION

1. Field of the Invention

This invention relates to the hydraulic fracturing of subterranean formations surrounding oil wells, gas wells, water wells, injection wells and similar boreholes.

2. Description of the Prior Art

Hydraulic fracturing is a widely used well stimulation technique designed to increase the productivity of a well by creating fractures in the formation surrounding the well. The technique normally involves two basic steps: (1) injecting a fluid into the formation at a rate and pressure sufficient to propagate a fracture adjacent the well and (2) placing propping agent particles in the fracture to maintain it in a propped condition when the applied pressure is relieved. During the propagation step of the treatment, the fracturing fluid must have properties which provide the proper wedging effect for creating a fracture of the desired geometry. These properties relate to the fluid loss characteristic and the viscosity of the fluid employed as the fracturing medium.

It has long been known that the fluid efficiency of a fracturing fluid must be high if fractures of reasonable lengths and widths are to be obtained. Fluid efficiency, as used in fracturing operations, is defined as the percent of injected fluid which remains within the fracture and is a measure of the fluid loss characteristic of the fluid. Many fluids tend to leak off rapidly into the formation matrix and therefore provide low fluid efficiencies. The fluid efficiency can be improved by the addition of fluid loss control additives, which are generally finely divided inert materials such as silica flour, talc, calcium carbonate, and the like.

More recently, the effect of fluid viscosity on fracture geometry has received considerable attention. It has been found that the viscosity of the fluid within a fracture plays a major role in determining the dynamic width of the fracture. Although the phenomenon is not fully understood, tests indicate that the high friction loss associated with the high viscosity fluids results in large fracture pressures which tend to force the fracture walls further apart.

Another important consideration in the design of fracturing fluid is the effect of the fluid on pumping requirements. The wedging effect described above must be achieved without excessive friction loss in the well conduit leading to the formation. High friction loss limits the available power deliverable to the formation and increases the power requirements of injection facilities.

During the proppant placement phase of the treatment, the fracturing fluid acts as a carrier for the propping agent particles. The fluid must thus be capable of suspending large concentrations of particles for long transport distances. The trend toward the use of large propping agent particles has increased the importance of the suspending properties of the fluid.

Finally, the fracturing fluid should not damage the formation. This generally means that the fluid at formation conditions must possess sufficient mobility in the formation matrix and the propped fracture to be producible into the well along with formation fluids. This operation is referred to as well clean-up.

The characteristics of an ideal fracturing fluid, the, can be summarized as follows: low friction loss in the well conduit; low fluid loss in the fracture; high friction loss in the fracture; good proppant suspension capability; and easily produced from the formation and fracture.

As indicated above, the recent trend in fracturing fluid formulation has been toward high viscosity fluids. Experience has shown that these fluids, when properly injected, can be used to generate wide fractures of considerable length and that they are capable of suspending large propping agent particles in high concentrations. The combination of large fracture width and length and the use of large propping agent particles has resulted in unusually high fracture conductivities. Fracture conductivity is the product of the width and permeability of a propped fracture. Since well stimulation is a function of the contrast between fracture conductivity and formation permeability, fracturing treatments are normally designed to provide as high a conductivity as practicable, particularly for high permeability formations.

A variety of high viscosity fluids have been proposed for use in hydraulic fracturing operations. These fluids can be classified as oil-base of water-base fluids depending upon the composition of the continuous phase. The high viscosity oil-base fluids, typified by the gelled hydrocarbon liquids, viscous oils, and the water-in-oil emulsions, are inherently temperature sensitive and therefore lose much of their viscosity in deep, high temperature wells. Moreover, the high viscosity hydrocarbons exhibit poor mobility in tight, low permeability formations and frequently require long clean-up periods when used to fracture these formations. The viscous oil-base fluids are therefore generally not recommended for use in extremely low pressure formations, particularly those in which the pressure is less than 100 psig, because of the lack of sufficient driving force for flushing the viscous liquid from the formations.

The high viscosity water-base fluids include viscous gelled waters, gelled acids, and oil-in-water emulsions. Viscous gelled water and gelled acids owe their high viscosities to the presence of water-soluble polymers in relatively high concentrations. These gelled fluids possess good proppant suspension capabilities and because of their non-Newtonian flow behavior, can usually be pumped through the well conduit at relatively low friction loss levels. However, many of these fluids have the disadvantage of being incapable of developing sufficient pressure in the fracture to create wide fractures. Moreover, in order to effect a substantial increase in fluid viscosity, the water-soluble polymers must be present at relatively high concentrations, usually between about 40 and 120 pounds per 1,000 gallons of fluid. The polymers used at these concentrations add substantially to the total cost of the operation. Laboratory tests have also shown that many of the viscous gelled waters are temperature sensitive—they lose viscosity at high temperatures which not only reduces the pressure generated in the fracture but also increases the rate at which the fluid leaks off into the formation matrix. These two factors, i.e., low fluid viscosity and high fluid loss at high temperatures, somewhat limit dynamic fracture geometry attainable with the viscous gelled waters.

Oil-in-water emulsions have also been proposed for use in fracturing operations. In order to provide the emulsion with sufficiently high viscosities, the concentration of the oil phase in these systems must be extremely high—in the order of 95 volume percent. At these high concentrations, considerable distortion of the discrete oil particles from the usual spherical shape occurs. Such systems are difficult to handle and generally exhibit high friction loss in the well conduit. Moreover, the emulsions are difficult to stabilize. Additives such as film strengtheners, inorganic salts, and deliquescent salts have been proposed for improving the properties of the oil-in-water emulsions. However, none of the proposed oil-in-water emulsion fluids have been widely used in fracturing operations.

SUMMARY OF THE INVENTION

The present invention provides a new fracturing method employing an improved oil-in-water emulsion as the fracturing fluid. The improved fluid is characterized by high viscosity but does not have the concomitant disadvantages associated with the high viscosity fluids of the prior art. The fracturing method comprises the steps of injecting the emulsion into a subterranean formation; applying sufficient pressure to the emulsion to open a fracture in the formation; and thereafter producing from the formation. The emulsion is a specially formulated composition comprising an internal oil phase, and an external water phase containing sufficient amounts of a water-soluble polymer to impart certain desired properties to the fluid. In order to impart sufficient, but not excessive, viscosity to the fluid, it has been found that the internal oil phase should constitute more than 50 but not more than about 80 volume percent of the emulsion, and that the polymer concentration in the external water phase should be sufficient to provide the water phase with an apparent viscosity of between 10 and 200 centipoises at 70° F and a shear rate of about 511 reciprocal seconds. The friction loss characteristic of the fluid dictates that the internal oil phase concentration be not more than about 80 volume percent. Higher concentrations result in excessive friction loss when the fluid is pumped through the well conduit.

While emulsions containing up to about 80 volume percent of the internal phase can be employed in the practice of the present invention, experience has shown that the stability of emulsions in the upper part of the 50 to 80 percent range is generally sensitive to the type of mixing technique employed. In field operations, the blending equipment does not permit mixing the fluid components in precisely the desired volumetric ratios. For field application of the method, then, the concentration of the fluid components should fall within the range which is easily emulsified using field blending equipment, thus allowing for minor variations in the proportions at which the fluid components are mixed. Laboratory tests have shown that when the internal phase exceeds about 75 volume percent, stability problems begin occurring. These test indicate that the preferred upper limit for the internal oil phase concentration is about 75 volume percent.

The type of polymer usable in the present invention can be selected from a wide variety of organic polymers capable of giving viscous aqueous solutions or dispersions. As used herein, the term aqueous polymer solution shall mean water containing a water-dispersible or water-soluble polymer. In addition to building the fluid viscosity, the polymer also has a pronounced effect on the flow behavior of the emulsion. Many of the water-soluble or dispersible polymers behave as friction reducers when present in the external phase. This property is particularly important in fracturing operations performed in deep wells or through small diameter conduits. Polymers usable in the present invention include derivatives of cellulose, natural gums, heteropolysaccharides, polysaccharides, synthetic polymers, and blends thereof.

In practice, the volume proportion of the oil phase in the emulsion and the concentration of the polymer in the water phase will be controlled to give the desired emulsion viscosity, which preferably should be at least 100 centipoises at 70° F and 511 reciprocal seconds. Fluids having viscosities of at least 100 centipoises are capable of suspending large propping agent particles and retain sufficient viscosity at reservoir temperatures and high shear rates to provide the fluid wedge described above.

Laboratory experiments and fluid tests have shown that the fluid employed in the present method satisfies, unusually well, the characteristics required for a fracturing fluid. The fluids exhibited low friction loss in the well conduit, gave low fluid loss values, resulted in the generation of high pressures in the fracture, had good proppant suspension capability, and were easily removed from the formation following the fracturing treatment.

DESCRIPTION OF THE PREFERRED EMBODIMENTS

The fracturing method of the present invention employs an improved oil-in-water emulsion containing more than 50 but not more than about 80 volume percent of an internal oil phase and the remainder an external water phase—i.e., less than 50 but not less than about 20 volume percent of an external water phase. The water phase comprises an aqueous polymer solution having a viscosity of at least 10 centipoises, and preferably between about 10 and about 100 centipoises, at 70° F and a shear rate of 511 reciprocal seconds. The aqueous polymer solution can be prepared by adding water-soluble polymeric thickening agent to the water prior to mixing the water and oil phases together. From these fluids, the emulsion can be made by a continuous or batch mixing technique. The fracturing method is carried out by injecting the emulsion under sufficient pressure to open a fracture in the formation.

As indicated above, the external water phase of the emulsion should have a minimum apparent viscosity of 10 centipoises at 70° F and a shear rate of 511 reciprocal seconds. The viscous water retards the leak-off rate of the external phase into the formation matrix as the emulsion passes through the fracture. A rapid leak-off rate such as that provided by plain water is undesirable since it would cause the emulsion to invert or break too readily. This would return the emulsion constituents to their original low viscosity states prematurely. The viscous water also improves the particle-carrying ability of the external phase. This becomes particularly important when a particulate fluid loss control additive is used in the system. The viscous external phase also improves the stability of the emulsion as the tendency of the dispersed oil particles to coalesce is substantially reduced.

In order to be able to suspend large propping agent particles, the fracturing fluid should have a relatively high viscosity at surface conditions. Experience has shown that the fracturing fluids used in the practice of this invention with apparent viscosities of at least 100 centipoises at 70° F and a shear rate of 511 reciprocal seconds, can adequately suspend sand particles as large as 6–8 mesh with reasonable low settling rates. These fluids can also tolerate substantial viscosity reductions at elevated formation temperatures and higher shear rates and still provide adequate fluid efficiencies for generating long, wide fractures.

In order to provide a stable emulsion in the preferred volume ratios of the oil and water phases, an emulsifier is generally required. A wide variety of emulsifiers are commercially available and include the anionic, cationic, and nonionic emulsifiers. A number of water-soluble or water-dispersible polymers also possess surface active properties and in some systems may serve as emulsifiers as well as viscosity builders.

In a typical treatment, the fracturing fluid will be formulated from four basic ingredients: an aqueous liquid providing the external water phase, a hydrocarbon liquid providing the internal oil phase, an emulsifier for promoting and stabilizing the emulsion, and a polymeric thickening agent for building viscosity of the water phase. The fracturing fluid may include other constituents such as fluid loss agents, proppants, gel breakers, water softeners, ammonium hydroxide, and demulsifiers.

Choice of the aqueous and hydrocarbon liquids will generally be governed by the availability of the liquids involved. When employing anionic or cationic emulsifiers that are sensitive to the presence of divalent ions, soft water should generally be used. However, hard water including sea water or brine, if properly treated with water-softening chemicals such as trisodium phosphate or hexametaphosphate, can be employed. If available, water from a public water supply can be used with the sensitive emulsifiers. This water, however, should be tested for hardness and softened, if necessary. As a general rule, the nonionic emulsifying agents are not sensitive to the divalent ions and therefore can be used in hard water.

The hydrocarbon liquid can be a crude oil or a virgin or refined petroleum fraction such as kerosene, gasoline, diesel oil, gas oil, or the like. Crude oil produced from the formation to be treated is preferred because of its availability and because of its compatibility with the formation. Emulsions containing crude oil as the internal phase generally provide for rapid well clean-up following the treatment. If crude oil is not available, other hydrocarbon oils can be used. These oils preferably should have a viscosity not greater than are of formation oil. Hydrocarbon liquids having a viscosity less than about 10 centipoises at formation temperature are preferred for most applications. Gas condensate, if available, can also be used and offers the advantage of promoting even more rapid well clean-up. Condensate is a light volatile liquid with an API gravity greater than about 50. It normally comprises the condensable hydrocarbon fractions produced from a gas or a gas condensate well. The major portion of these fractions generally include $C_7 - C_{16}$ hydrocarbons. In the reservoir, the condensable hydrocarbon fractions, or at least a portion thereof, re in the gaseous state but at surface conditions they condense to form a liquid which is separated from the gas and collected in suitable surface facilities. The condensate constituting the internal phase of the emulsion will retain its liquid character as long as the fracturing pressure is maintained on the emulsion. However, when the applied pressure is removed and the well is placed on production, the dispersed condensate particles in the fracture will be vaporized as formation gas commingles with the emulsion or emulsion phases. Vaporization of the condensate not only breaks the emulsion but transforms the oil phase of the fracturing fluid into a highly mobile gas. This permits rapid well clean-up, particularly for gas or condensate wells.

The selection of the most efficient emulsifier and its concentration in the water phase will depend upon several factors, including the composition of the oil and water to be emulsified, the temperature of the formation to be treated, the type of blending equipment available, and the composition of the additives to be employed in the emulsion. The most efficient emulsifier or blend of emulsifiers for a particular system may require a selection by a trial-and-error process. The trial-and-error selection can be aided and guided by the familiar hydrophile-lipophile-balance (HLB) method. Emulsifiers or blends of emulsifiers having HLB numbers in the range from 8 to 18 are generally considered oil-in-water emulsifiers. See Emulsions: Theory and Practice, by Becher, published by Reinhold Publishing Corporation, New York, U.S.A., copyright 1957, for a detailed explanation of the HLB method and for a list of emulsifiers and corresponding HLB numbers.

As indicated earlier, the emulsifier may be an anionic, cationic, or nonionic surfactant. Suitable anionic emulsifiers for many emulsions of the invention include the alkali, amine, and other carboxylic acid soaps. As is well known in the emulsion art, these soaps are generally the salts of long-chain fatty acids derived from naturally-occurring animal and vegetable fats and oils. The mixed fatty acids of tallow, coconut oil, palm oil, soybean oil, and the like are the most commonly employed. Other sources of carboxylic acids include tall oil and rosin. Many of the carboxylic acid soaps such as the alkali and amine soaps have the added advantage in the system contemplated of being deactivated in the presence of divalent ions. When the emulsion comes in contact with formation fluids, the calcium or magnesium ions, which are almost always present in the connate water, deactivate the emulsifier and break the emulsion. This returns the oil and water components to their original demulsified viscosities which are much lower than the emulsion viscosity. When the well is placed on production, the water and oil are then easily flushed from the formation.

When using the alkali and amine soaps, it is usually advisable to operate with soft water because these soaps are sensitive to divalent ions such as calcium. The water available at the well site generally will require treatment with a water-softening chemical as suggested earlier. These soaps are generally made by adding the fatty acid and a base to the water phase prior to blending the two phases together. Alternatively, the fatty acid can be dissolved in the oil phase and the base in the water phase. The soap forms at the interface as the two phases are brought together. Suitable bases for the preparation of alkali soaps include sodium hydroxide and potassium hydroxide. Suitable bases for forming the amine soap can be selected from a wide variety of amines such as triethanolamine, morpholine, and 2-amino-2-methyl-1,3-propanediol.

Ammonium hydroxide when added in small concentrations to the oil phase of systems described above appears to improve the stability of the emulsion. Laboratory experiments and field tests have shown that when the water phase containing an emulsifier and the oil phase containing the ammonium hydroxide are brought together, a more stable emulsion is formed than in the same system without the ammonium hydroxide. The concentration of the ammonium hydroxide can be from about 0.01 to about 0.10 volume percent based on the volume of the oil, with about 0.05 volume percent being preferred.

Although the cationic emulsifying agents are not widely used for promoting oil-in-water emulsions, some exhibit high HLB numbers indicating that they can be employed for this service. The cationic emulsifying agents of principal importance are amines and quaternary ammonium salts such as polyoxyethylene sorbitol oleate-polyoxyethylene amine blend, polyoxyethylene alkyl amine, and quaternary ammonium derivatives.

The nonionic emulsifying agents are generally independent of water hardness and pH and are therefore compatible with hard water. A few of the general purpose nonionic emulsifiers capable of promoting stable oil-in-water emulsions include polyoxyethylene sorbitan monolaurate, polyoxyethylene lauryl ether, polyoxyethylene monostearate, polyoxyethylene oxypropylene stearate, polyoxyethylene cetyl ether, polyoxyethylene sorbitan esters of mixed fatty and resin acids, polyoxyethylene glycol monopalmitate, and polyoxyethylene sorbitan monopalmitate.

The concentration of the emulsifying agent in the water will depend upon a multitude of factors. The optimum concentration for a particular system will generally be determined on a trial-and-error basis. Concentrations between about 0.1 weight percent and about 3.0 weight percent of the emulsifying agent based on the weight of the aqueous phase should be satisfactory for most applications.

As mentioned previously, many of the polymeric thickening agents which possess surface active properties can be used as the emulsifier to promote the oil-in-water emulsion. The carboxyvinyl polymers are representative of this group. Polyvinylcarboxylic acid neutralized with a long-chain amine and a common base such as sodium hydroxide is capable of promoting extremely stable oil-in-water emulsions. The emulsified system exhibits excellent temperature resistance and therefore can be used in deep, high-temperature wells.

The polymeric thickening agent can be any one of a variety of long-chain, water-soluble polymers capable of building the viscosity of an aqueous solution. These polymers are commonly referred to as gums. Synthetic and modified polymers and natural gums can be used. The synthetic and modified polymers include the acrylic polymers such as polyacrylamide and polyacrylic acid; the vinyl polymers such as polyvinylpyrrolidone and polyvinylcarboxylic acid neutralized with a long-chain amine and a common base; and the cellulose derivatives such as sodium carboxymethylcellulose, sodium carboxymethylhydroxyethylcellulose, methylcellulose, hydroxyethylcellulose, and ethylhydroxyethylcellulose.

Natural gums include guar gum, gum arabic, gum tragacanth, gum karaya, and the like. Also unable are the microbial fermentation gums such as dextran and the heteropolysaccharides produced by the bacteria of the genus Xanthomonas. In some applications, it may be desirable to use both natural and synthetic polymers, since their respective chemical effects on the emulsion may be different, For example, many of the natural gums operate to form protective colloids on the dispersed oil particles, as well as thickening the water phase of the emulsion. Many of the natural gums also are more effective in controlling the fluid loss of the fluid than are the synthetic polymers. In selecting the polymeric thickening agent and the emulsifying agent for a particular system, care should be exercised to insure that the chemicals are compatible.

The concentration of the polymeric thickening agent in the water phase will depend upon the effectiveness of the material used and the apparent viscosity desired. Experience has shown, however, that a polymer concentration between about 0.1 and 1.0 weight percent based on the weight of the water phase is sufficient for most applications.

Additional additives that may be employed in the fracturing fluid include fluid loss control additives such as silica flour, lime, talc, and the like. The concentration of the fluid loss control additive will depend in part on the inherent fluid loss characteristic of the emulsion. For many highly viscous liquids, the fluid loss characteristics of the fluid are low and only small amounts of the fluid loss control additives are required to obtain the desired fluid loss characteristic. Additional additives can include slow-acting demulsifying agents for breaking the emulsion and chemicals for degrading the polymeric thickening agent. These materials may be required in certain systems to transform the viscous emulsion to a demulsified, low viscosity state for promoting well clean-up. In some systems, it may prove satisfactory to merely degrade the polymer. The emulsion without the polymer may have sufficient mobility to permit rapid well clean-up. If the formation to be treated contains water-sensitive clays, salt such as potassium chloride can also be added to the fluid.

LABORATORY EXPERIMENTS

The primary function of the polymer is to build the viscosity of the water phase. However, the presence of the polymer also improves other important properties of the fracturing fluid. These properties relate to friction loss, fluid loss, emulsion stability, and viscosity behavior of the fluid at elevated temperatures. Laboratory experiments carried out with different emulsions demonstrate many of the fluid properties referred to above. Other experiments provide comparison between certain properties of an emulsion usable in the present invention and those of other types of fracturing fluids. The results of these experiments are described in detail below.

Figure 3:
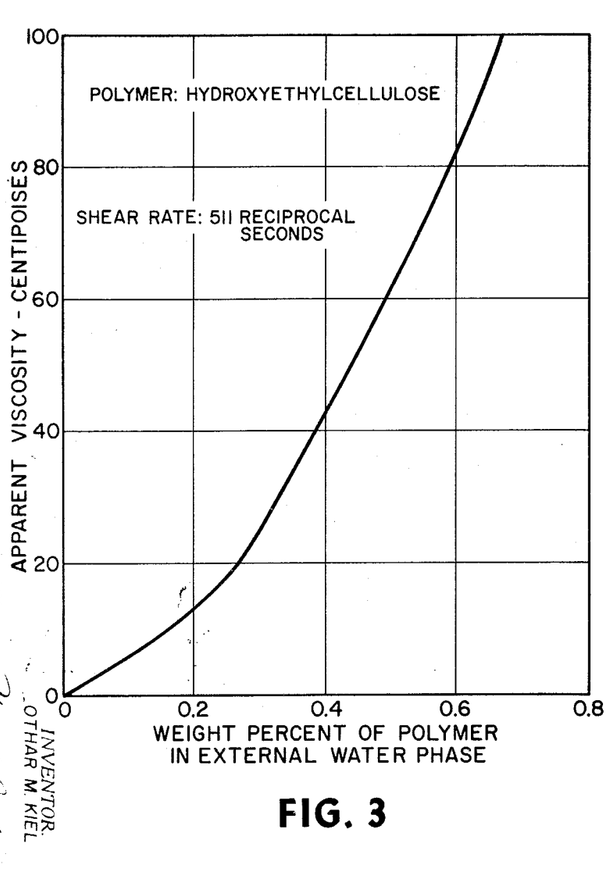
FIG. 3 is a plot showing the effect of a polymeric thickening agent on the apparent viscosity of water.

The effect of a polymeric thickening agent, hydroxyethylcellulose, on the viscosity of tap water is shown in FIG. 3. As illustrated, the polymer concentration in the water phase and the water viscosity follow, generally, a straight line relationship at concentrations greater than about 0.2 weight percent. However, when a polymer is incorporated in the external phase of an emulsion wherein the internal oil phase represents the major volume proportion, a second thickening mechanism becomes involved. This second mechanism, which apparently results from a crowding of the dispersed oil particles, has a pronounced coacting relationship with the first mechanism when the oil phase comprises greater than 50 volume percent of the emulsion.

Figure 1:
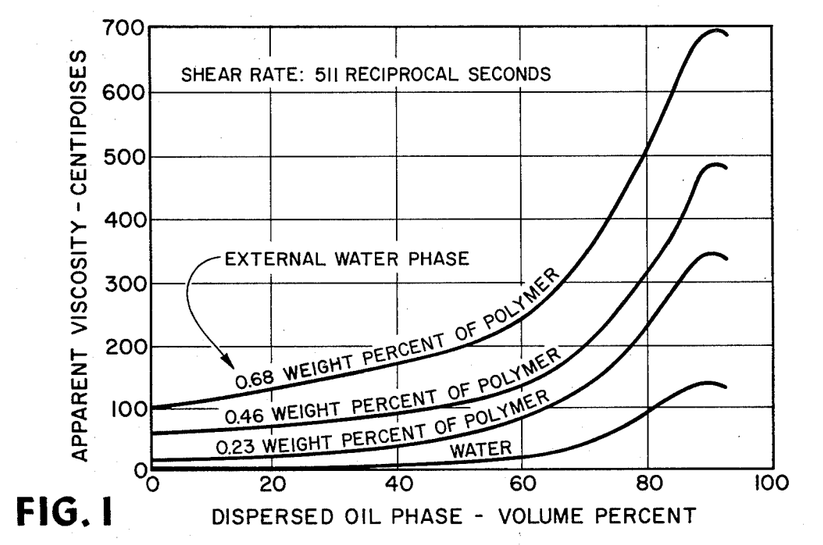
FIG. 1 is a plot showing the relationship between apparent viscosity of an oil-in-water emulsion and the concentration of the internal oil phase and the concentration of a polymeric thickening agent in the external aqueous phase.
Figure 2:
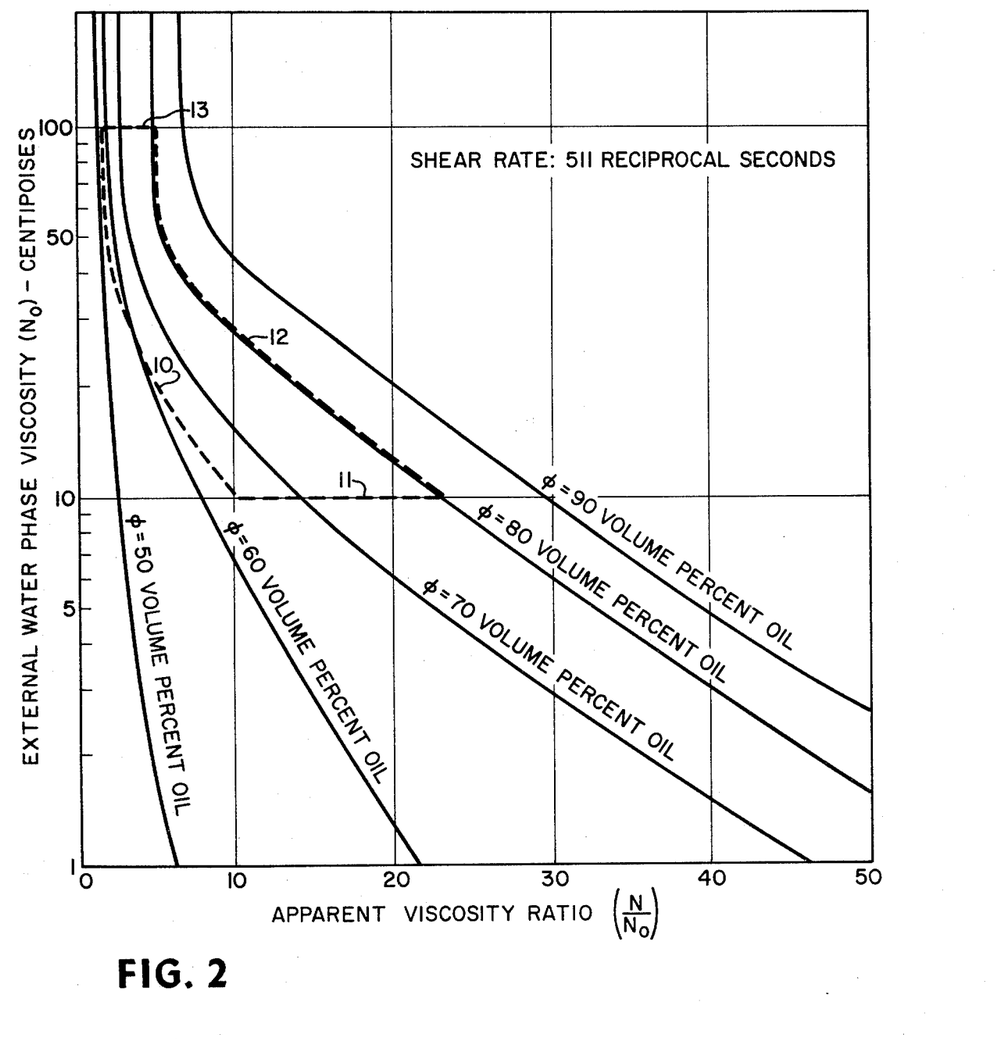
FIG. 2 is a plot showing the relationship between the apparent viscosity of the external water phase and the apparent viscosity of the emulsion at various concentrations of the dispersed oil phase.

FIGS. 1 and 2 are plots for emulsion systems containing varying concentrations of the dispersed oil phase and varying amounts of a polymeric thickening agent. The curves illustrate the effects of these two variables on the emulsion apparent viscosity. The basic constituents of the system investigated were as follows:
water phase : tap water
oil phase : kerosene
emulsifier : fatty acid soap
polymer : hydroxyethylcellulose The hydroxyethylcellulose used was a product of Hercules Incorporated marketed under the tradename of Natrosol type 180 HHW.

The apparent viscosities of the various systems, which differed from one another only by the relative proportions of the oil and water phases and the concentration of the polymer, were measured by a Fann Model 39 Viscometer at 70° F and a shear rate of 511 reciprocal seconds. The curves appearing on FIGS. 1 and 2 show apparent viscosities at these conditions.

Figure 6:
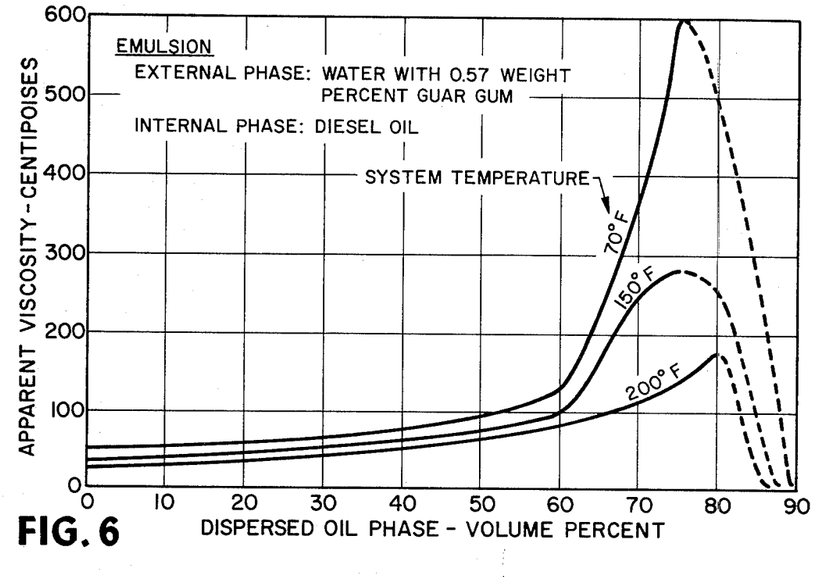
FIG. 6 is a plot showing the relationship between apparent viscosity and the concentration of the dispersed oil phase and treating temperature for an emulsion prepared from diesel oil and an aqueous polymer solution.
Figure 7:
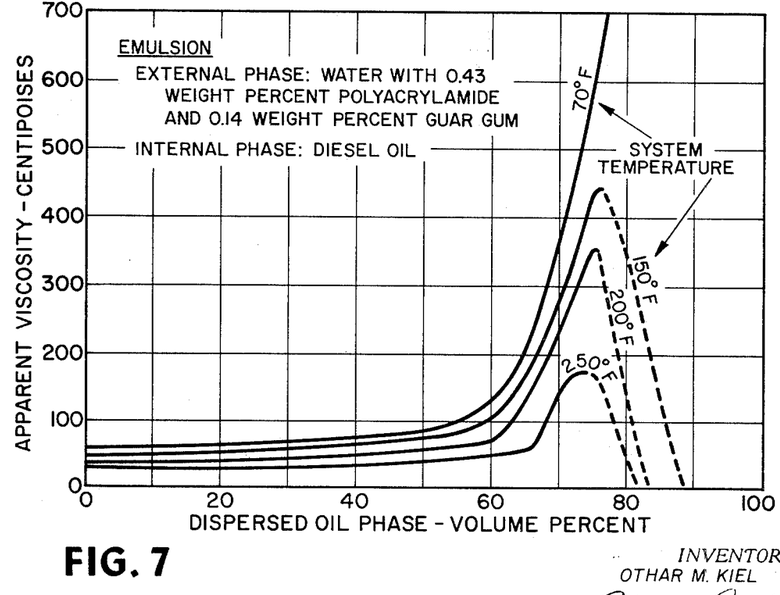
FIG. 7 is a plot similar to FIG. 6 for emulsions prepared from a different aqueous polymer solution.

Although the plots of FIGS. 1 and 2 were prepared using test data from a system containing hydroxyethylcellulose, the results are representative of most emulsion systems. The plots of FIGS. 6 and 7 illustrate the viscosity behavior of emulsions containing other types of polymers. The apparent viscosities of these systems differed from those appearing in FIG. 1, but the characteristic of increasing viscosity at relatively high oil concentrations is evident in all three systems.

Returning to FIG. 2, the ordinate denoted $N_o$ represents the apparent viscosity of the external water phase which can be obtained using hydroxyethylcellulose. The abscissa scale is the apparent viscosity ratio, $N/N_o$, and represents the factor by which the external phase apparent viscosity can be multiplied to obtain the apparent viscosity of the emulsion. The plot illustrates the relationship between the apparent viscosity ($N$) of the emulsion and the apparent viscosity ($N_o$) of the external phase at various oil concentrations ($\phi$).

It has been mentioned earlier that the fracturing fluid should preferably have an apparent viscosity of at least 100 centipoises and that the external water phase should have an apparent viscosity between about 10 and about 200 centipoises at 70° F and 511 reciprocal seconds.

Figure 5:
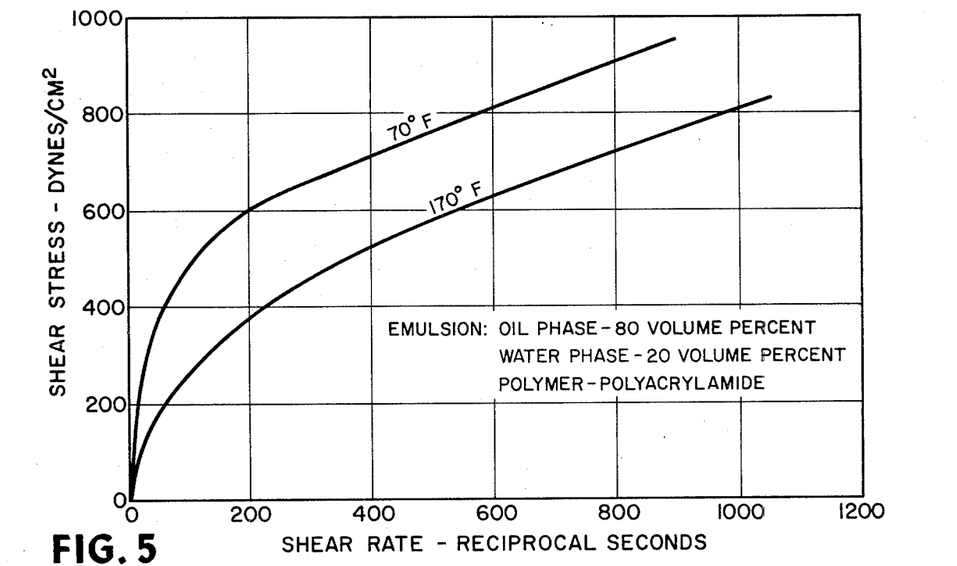
FIG. 5 is a shear stress versus shear rate plot for an emulsion usable in the method of the present invention.

The importance of the 100 centipoise apparent viscosity of the emulsion as a design parameter for fracturing fluids can best be illustrated with reference to FIG. 5. FIG. 5 shows the non-Newtonian behavior of a fluid comprising 80 volume percent oil and 20 volume percent water containing 0.23 weight percent of polyacrylamide. The polyacrylamide used in these tests and other tests described below was obtained from The Dow Chemical Company under the product designation J-201. The two curves illustrate the behavior of the fluid at 70° F and 170° F. The apparent viscosity at 70° F and a shear rate of 511 reciprocal seconds is about 147 centipoises. However, at 170° F and a shear rate of 1,050 reciprocal seconds, the apparent viscosity is only 78 centipoises. Thus the viscosity is affected not only by higher temperatures but also by higher shear rates. The term apparent viscosity as used herein is defined as the ratio of shear stress to shear rate. This definition is consistent with that generally used in the investigation of non-Newtonian fluids. (See Rheology Theory and Applications, Volume 3 edited by Frederick R. Eirich, Academic Press (1960), page 198.) In many fracturing treatments the shear rate and temperature are much greater than 1,050 reciprocal seconds and 170° F, respectively, which would result in even lower apparent viscosities. The sensitivity of the emulsion to shear thinning and viscosity reductions at high temperatures makes it important that the fluid have an apparent viscosity of at least 100 centipoises at 70° F and a shear rate of 511 reciprocal seconds.

The viscosity limitations placed on the fracturing fluid determine the various combinations of $\phi$ and $N_o$ which can be used in the method of the present invention. The enclosed area bounded by lines 10, 11, 12, and 13 on FIG. 2 embraces the preferred combinations of $N_o$ and $\phi$. As illustrated, line 10 follows generally the curve for $\phi = 60$ volume percent. Thus, the oil concentration will preferably be above 60 volume percent, although oil concentrations between 50 and 60 volume percent can be used where the apparent viscosity of the water phase in this system is greater than bout 30 centipoises. The reason that these systems satisfy the viscosity conditions is not fully understood. However, it appears to be due at least in part to the structural viscosity provided by the crowding effect of the oil particles. This is reflected by the fact that the viscosity ratios for the various systems increase markedly at oil concentrations greater than 60 volume percent.

For an oil concentration of 60 volume percent and an external phase apparent viscosity of 20 centipoises, the apparent viscosity ratio is about 5. This means that the emulsion viscosity if is 5 times greater than the viscosity of the external water phase. At 50 volume percent or less of the oil phase, the structural viscosity resulting from particle crowding has little effect on the emulsion viscosity. This is reflected by the low viscosity ratios for the 50 volume percent curve. For this curve the viscosity ratios ranged from about 2.0 to about 3.5 between $N_o$ values of 100 centipoises and 10 centipoises.

As the concentration of dispersed oil phase increases beyond the 60 volume percent level, the apparent viscosity ratio becomes even more striking. For example, for a $\phi$ of 70 volume percent and an $N_o$ of 10 centipoises, the viscosity ratio is 14 which gives an emulsion viscosity of 140 centipoises. Thus, it is seen that at the high viscosity ratios, the viscosity of the emulsion is primarily due to structural viscosity. This is a significant advantage to fracturing operations since less polymer, which is quite expensive, can be used in systems which exhibit the high viscosity ratios. For example, a system having a dispersed oil phase of 50 volume percent requires about 0.43 weight percent of the hydroxyethylcellulose, based on the weight of the external water phase, to give an emulsion viscosity of 100 centipoises (see FIGS. 2 and 3). In contrast, a system having a dispersed oil phase of 60 volume percent requires only 0.27 weight percent of hydroxyethylcellulose, based on the external water phase, to give an emulsion viscosity of 100 centipoises. Moreover, the 60 volume percent oil system contains less water, which further reduces the amount of polymer required. The savings resulting from the lower amounts of the polymer required in the 60 volume percent oil system over the 50 volume percent oil system are substantial, considering that a typical fracturing treatment uses about 500 barrels (175,000 pounds) of water in the emulsion.

As indicated above, the viscosity of the emulsion, N, should preferably be greater than 100 centipoises. This relationship is not restricted to the systems tested nor the particular plot shown, but applies to all of the preferred systems used in the present fracturing method. The apparent viscosity ratio, preferably, should be at least 3 in order to gain substantial benefit from the structural viscosity. However, the apparent viscosity of the emulsion should not be so high as to impair handling and pumping operations. The apparent viscosity of the emulsion preferably should not exceed about 400 centipoises at 70° F and a shear rate of 511 reciprocal seconds. When the emulsion must be pumped through long pipe strings or through small diameter pipe strings, e.g. nominal size of 4 inches or less, the apparent viscosity of the emulsion should not exceed about 300 centipoises at 70° F and 511 reciprocal seconds.

The structural effect of the dispersed oil phase on emulsion viscosity is also illustrated in FIGS. 1, 6, and 7. As shown, the slope of each of the curves corresponding to the emulsions containing the polymer increases gradually as the oil proportion exceeds 50 volume percent and increases sharply in the 60 to 75 volume percent range. The effect of the concentration of the internal oil phase was also noted at high temperatures (see 6 and 7). These curves reveal that the structural viscosity of the dispersed oil particles is more than merely additive to the viscosity of the water phase. The concentration of the oil phase has a magnifying effect on emulsion viscosity, the degree of magnification for the emulsion containing hydroxyethylcellulose being represented by the viscosity ratios of FIG. 2. Thus relatively small concentrations of the polymeric thickening agent in the external phase permit the development of high fluid viscosities at oil concentrations which are easily emulsified.

Emulsions containing high concentrations of oil are difficult to stabilize, particularly with the blending facilities available in the field. The following laboratory tests illustrate the stability problems likely to occur at high internal phase concentrations. A tap water sample containing 0.57 weight percent of guar gum and 0.4 volume percent of an emulsifier (sodium tallate) was prepared. The viscosity of this aqueous polymer solution was measured on a Model 50B Fann Viscometer at temperatures s of 70° F, 150° F, and 200° F. An emulsion was then prepared using the aqueous polymer solution and 2-centipoise diesel oil. The internal oil phase of the emulsion was increased in a step-like manner with the viscosity at the three temperature levels being measured at each step. Viscosities were measured at internal oil phase concentrations of 30, 50, 60, 65, 70, 75, 80, and 90 volume percent. The plots of FIG. 6 were prepared from these recorded data. Similar tests were run on an emulsion prepared from an aqueous polymer solution comprising tap water, 0.43 weight percent of polyacrylamide, and 0.14 weight percent of guar gum, and 2 centipoise diesel oil. Sodium tallate in a concentration of 0.4 volume percent based upon the volume of the water was used as the emulsifier. The viscosity at various internal phase concentrations was measured at temperatures of 70° F, 150° F, 200° F, and 250° F. The recorded data from these measurements were used to prepare the plots of FIG. 7.

As shown in FIG. 6, the maximum viscosities of the samples measured at 70° F and 150° F were recorded at the 75 percent internal oil phase concentration. The measured viscosities at the data point corresponding to 80 percent internal phase were substantially less than that recorded at the 75 percent internal phase data point indicating that the emulsion began deteriorating somewhere between 75 and 80 percent internal phase concentration. At 200° F, the maximum viscosity was recorded at 80 percent internal phase concentration. At this temperature level, the emulsion became unstable somewhere between 80 and 90 percent internal phase concentration.

The emulsion containing the polyacrylamide-guar gum mixture in the aqueous phase (FIG. 7) appeared to be stable to an internal oil phase concentration of 80 percent at room temperature (about 70° F) but at the 90 percent concentration level, the emulsion had deteriorated to such an extent that the viscosity could not be measured. At the higher temperature levels, however, stability problems began occurring between the 75 percent and 80 percent concentration ranges.

From the data appearing on FIGS. 6 and 7, the upper limit of internal oil phase concentration appears to be about 80 percent and preferably about 75 percent. By selecting the proper emulsifier, it is possible that a stable emulsion can be prepared at concentrations higher than the 80 percent limit; however, the risk of producing an unstable emulsion is significantly increased. Moreover, in field applications, the system is generally designed to take into account variations in the ratio of fluid blends. Normally the relative volumes of the internal oil phase and the external water phase can be blended within a volumetric accuracy of about 5 percent. Thus, by designing the emulsion to contain 75 volume percent of an internal phase, the entire system probably will not contain a uniform 75 volume percent of oil; instead, portions may be as high as 80 volume percent. This safety factor insures that a stable emulsion will be produced.

Aside from the stability problem, field tests have shown that from a friction loss consideration, an internal oil phase concentration of 80 volume percent represents the upper limit for emulsions usable in the method of the present invention. In these systems, the polymer used to thicken the external water phase should have properties capable of imparting drag reduction behavior to the fluid. The polyacrylamide polymers are particularly effective drag reducers.

The plots of FIGS. 6 and 7 also illustrate the effect of dispersed oil particles on emulsion viscosity. This effect previously noted with reference to the emulsion containing hydroxyethylcellulose in the aqueous phase (FIG. 1), become quite pronounced at about the 60 percent concentration of the internal oil phase reaching a maximum somewhere between about 70 and 80 percent oil concentration levels. The reason for the pronounced effect on the internal oil phase on system viscosity is not clearly understood. However, this viscosity has been attributed to particle interference. In a system containing uniform spherical particles, particle distortion normally occurs when the oil concentration exceeds about 74 volume percent. In fluid systems used in fracturing operations, the size of the dispersed oil particles is far from uniform. Therefore particle distortion occurs at somewhat higher oil concentration than the theoretical 74 volume percent. The concentration at which the particle distortion occurs may have some effect on the emulsion stability which as indicated above becomes apparent within the 75–80 percent internal phase concentration range.

Figure 8:
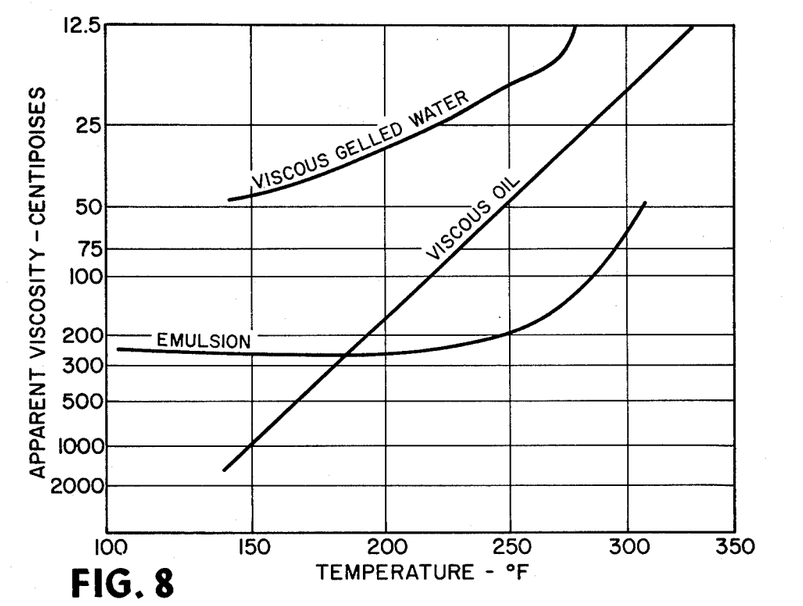
FIG. 8 is a plot comparing the viscosity characteristics of an emulsion usable in the method of the present invention and other viscous fracturing fluids.

As mentioned previously, the fracturing fluid should, in order to generate long, wise fractures, possess properties which favor high fluid efficiency in the fracture. These properties relate to fluid viscosity and the rate at which the fluid leaks off into the formation matrix. Laboratory tests have shown that emulsions usable in the method of the present invention are less sensitive to viscosity reduction at elevated temperatures than are viscous gelled water or viscous oil base fluids. The three plots presented in FIG. 8 illustrate the effect of temperature on fluid viscosity for three different fluids. The viscous gelled water consisted of tap water containing about 0.96 weight percent of a cross-linked guar gum. The viscous oil was an asphaltic oil having a viscosity of 1,000 centipoises at 150° F. The emulsion contained 70 volume percent of a 2 centipoise oil and 30 volume percent of tap water containing 0.43 weight percent of polyacrylamide and 0.14 weight percent of guar gum. A nonionic emulsifier was also used in this system. The viscosity and temperature relationship for each of the fluids was measured on a Model 50B Fann Viscometer. As illustrated in FIG. 8, the viscosity for the emulsion fluid exhibited very little viscosity reduction below about 250° F, whereas the viscous gelled water and viscous oil fluids exhibited substantial reductions in viscosity throughout the temperature range investigated. From these data, it is evident that the emulsion fluid retained substantially more viscosity at high temperatures and therefore would be expected to generate long and wider fractures than either the viscous gelled water or the viscous oil base fluids at temperatures above about 180° F.

Figure 9:
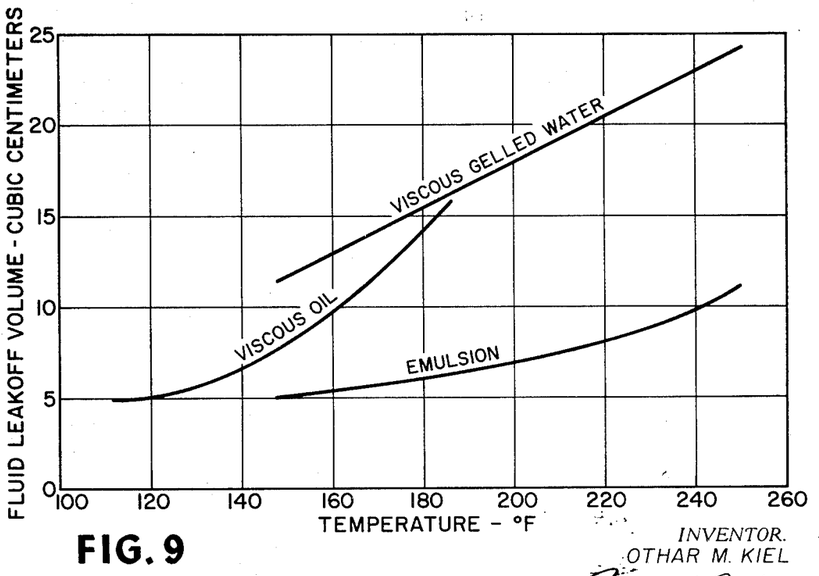
FIG. 9 is a plot comparing the dynamic fluid loss behaviors of an emulsion usable in the method of the present invention and other viscous fracturing fluids.

Dynamic fluid loss tests using the same fluids also revealed that the emulsion fluid provided better fluid loss control than either the viscous gelled water or the viscous oil fluids. The emulsion and viscous gelled water contained the equivalent of 20 pounds per 1,000 gallons of fluid of a particulate fluid loss additive. The fluid loss additive used in the water base fluids was a blend of silica flour and a commercial additive sold under the trade name Adomite Aqua. The viscous oil contained the equivalent of 30 pounds per 1,000 gallons of fluid of a commercial fluid loss additive sold under the trade name Adomite Mark II. The apparatus and technique used for measuring the dynamic fluid loss for each of the fluids is discussed in SPE Paper 2769, entitled "Fluid Loss from Hydraulically Induced Fractures" by B. B. Williams. Briefly, the fluid loss tests were performed on 2 millidarcy Bandera sandstone cores saturated with salt water. A differential pressure of 950 psi was maintained across the core during each test. The amount of fluid passing through the core was collected in a graduated cylinder and the total volume was recorded for a 20 minute test period. The fluid loss test or the viscous gelled water and the emulsion were run at temperatures of 150° F, 200° F, and 250° F. For the viscous oil fluid, the fluid loss tests were run at 110° F, 150° F, and 190° F. The relatively flat curve for the emulsion fluid indicates that the temperature effect on fluid loss of the emulsion was slight. For the other two fluids, however, increasing temperature resulted in substantial increases in fluid loss. The reason for the improved performance of the emulsion fluids is not fully understood. It appears, however, that the ability of the emulsions to retain higher viscosities at elevated temperatures partially accounts for the improved fluid loss results. Another factor which undoubtedly plays an important role in the mechanisms involved relates to the composition of the fluids. In the emulsion containing a major volume proportion of an internal phase and a minor volume proportion of an external phase, the two-phase flow of fluid through the core would be expected to be less than the flow of a single-phase fluid.

From the data appearing in FIGS. 8 and 9, it can be concluded that the emulsion fluid will provide higher fluid efficiencies in generating a fracture in a subterranean formation than would the other two types of fluids investigated.

Figure 4:
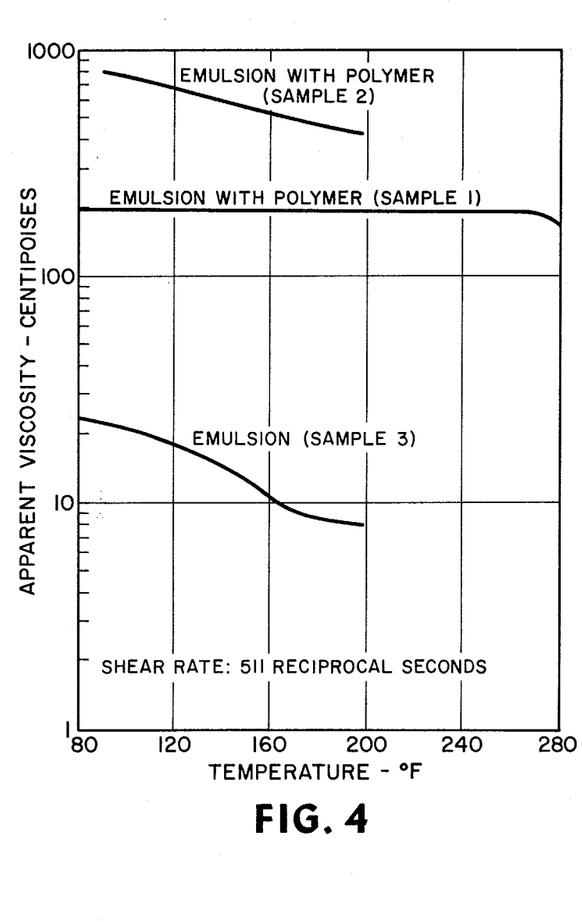
FIG. 4 is a plot showing the effect of temperature on the apparent viscosity of various oil-in-water emulsions.

The viscosity-temperature relationship for the emulsions is further illustrated in the plots of FIG. 4 which were prepared from recorded laboratory data. The viscosities of three emulsion samples were measured at various temperatures. The three emulsion samples had the following compositions:

Sample 1:
Tap water : 350 milliliters
Kerosene : 815 milliliters
Polyacrylamide : 1.6 grams
25 percent aqueous solution polyacrylic acid: 1 milliliter
Long-chain diamine : 0.5 milliliter
Sample 2:
Tap water : 350 milliliters
Kerosene : 1,400 milliliters
Tall oil acid : 1.4 milliliters
Sodium hydroxide : 0.2 grams
Hydroxyethylcellulose : 1.6 grams
Guar Gum : 0.8 grams
Sample 3:
Tap water : 350 milliliters
Kerosene : 815 milliliters
Tall oil acid : 1.4 milliliters
Sodium hydroxide : 0.2 grams In sample 1, the polyacrylamide was a product of The Dow Chemical Company sold as J–201; the polyacrylic acid was Acrysol A–3 manufactured by Rohm & Haas Company; and the diamine was Ethoduomeen T–13 manufactured by Armour Industrial Chemical Company. In sample 2, the hydroxyethylcellulose was Natrosol Type 180 HHW manufactured by Hercules Incorporated.

The viscosities of the samples were measured on a Fann Model 39 Viscometer at temperatures ranging from 80° F to 200° F for samples 2 and 3 and from 80° F to 280° F for sample 1. FIG. 4 illustrates the relationship between emulsion viscosity at a shear rate of 511 reciprocal seconds and emulsion temperature. The emulsion containing the polyacrylamide polymer (sample 1) showed no loss in apparent viscosity in the temperature range investigated. Thus, a fluid having the formulation of sample 1 can be used to fracture a formation having a normal subsurface temperature of 280° F based on its viscosity at 80° F. The viscosity of sample 2 containing the hydroxyethylcellulose and the guar gum declined from about 800 centipoises to about 400 centipoises between temperatures of about 80° F and about 200° F. The viscosity of the emulsion without polymer declined from 24 centipoises to 8 centipoises between the temperatures of about 80° F and about 200° F. The effect of temperature on the viscosity of emulsions appears to be more pronounced in emulsions without polymer in the external phase than in emulsions with polymer in the external phase.

The plots of FIGS. 4, 6, and 7 can be quite helpful in designing a system for a particular reservoir. If a high fluid viscosity is desired, the polymer selected for incorporating in the system should be a polyacrylamide or a polyacrylamide-guar gum mixture, as these polymers give more viscosity than a comparable amount of guar gum alone. It is significant to note also that the fluid system containing polyacrylamide or polyacrylamide-guar gum mixture can be used to treat formations having temperatures in the 250°–280° F range. For treating low temperature formations, particularly those with temperatures below about 150° F, the system need contain only the lower priced guar gum.

In order to realize the full potential of the stimulation, the fracturing fluid must be removed from the formation matrix and propped fracture following the treatment. Removal of the fracturing fluid, commonly referred to as well clean-up, relies upon the flushing action of the formation fluid flowing into the well. For high permeability wells or high pressure wells, the fracturing fluid used in the present method should not present serious clean-up problems. However, for tight formations or for low pressure formations, it may be desirable to convert the fracturing fluid into a low viscosity fluid in order to promote rapid well clean-up. This can be done in a variety of ways. The polymeric thickening agent can be selected to decompose with time or at formation conditions. A gel breaker can be added to the system to reduce or eliminate the effect of the polymeric thickening agent after sufficient time has elapsed. A slow-acting demulsifying agent can also be added to this system. For example, a water-soluble amine such as diethyl amine can be employed with a nonionic emulsifier such as polyoxyethylene sorbitol monolaurate to produce the desired viscosity reduction after the emulsion has been injected into the formation. These techniques are commonly employed in fracturing operations to decompose the polymer used in gelled water systems or to neutralize the effects of the emulsifier used in the emulsion system. As mentioned above, many of the anionic emulsifying agents are sensitive to divalent ions such as calcium. These ions are almost always present in the connate water of the formation. Use of these anionic emulsifiers produces a system which can be demulsified merely by contacting the fluid with the connate water of the formation. This can be accomplished by producing the formation fluids through the invaded zone whereupon the calcium ions contact and deactivate the anionic emulsifiers.

FIELD PROCEDURE

In the field application of the present invention, it generally will be more convenient to prepare the emulsion at the well site, although some of the components can be premixed if desired. Emulsification can be achieved by a batch process or by a continuous process. In the former, the emulsion is prepared at the surface before injection operations are commenced, whereas in the latter, the emulsion is prepared "on the run." The fluid treating and mixing techniques in both processes are generally the same, the principal difference being that in the batch process the prepared emulsion is discharged from blending equipment into a surface tank; whereas in the continuous process the emulsion is discharged directly into the suction of the fracturing pumps. The continuous process is preferred, however, since it permits more efficient employment of surface equipment. For this reason, the field application of the present invention will be described in connection with the continuous process.

The equipment required to perform the fracturing operations include a water tank, oil tanks, blending equipment, and fracturing pumps. Normally one 500 barrel tank is sufficient to contain the water. The number of oil tanks will depend upon the treatment volume and the desired oil concentration in the emulsion. For treatments employing 500 barrels or less of an emulsion containing about 70 volume percent oil, one 500 barrel oil tank is sufficient. For treatment volumes between 500 barrels and 1,500 barrels of the same emulsion, two 500 barrel oil tanks are sufficient although three oil tanks are sometimes used to facilitate blending and proportioning operations. For larger treatments, sufficient tanks should be provided to contain the fluids to be used in the treatment.

Initially, the tanks and blender are delivered to the well site. The water and oil to be used in the emulsion are first delivered and transferred to the respective tanks. The volume of oil and water delivered to each tank should be in excess of the volume required to perform the fracturing treatment. For 500 barrel tanks, an excess volume of about 25 barrels in each tank is sufficient. The excess volume prevents a loss of suction during the latter stages of the pumping operation. With the tanks properly filled, the water-soluble components and the oil-soluble components are admixed with the water and oil, respectively, by utilizing the blending equipment to uniformly disperse the components in their respective liquids.

The water-soluble components will normally include water softening chemicals, an emulsifier, and a water-soluble polymer. Potassium chloride can also be used if the formation to be treated contains water sensitive clays. It has been found expedient to add the water-soluble components in the following order: First the water softener, if used; then the emulsifier, followed by the polymer; and finally, the potassium chloride, if used. Except for the emulsifier, the materials can be introduced into the blender tub while circulating water through the blending equipment.

When using an ionic emulsifier which is sensitive to the presence of divalent ions, it is important that the water be softened prior to introduction of the emulsifier. The water hardness can be measured on a representative sample by use of a conventional measuring kit. For each grain of hardness per gallon of water, about 1 pound of trisodium phosphate or 1¼ pound of hexametaphosphate per 100 barrels of water can be used to soften the water. The water softener can be introduced into the blender tub while circulating water through the blender. After the water softener is thoroughly dispersed in the water, the water should be permitted to set for a time sufficient to permit complete reaction of the chemical.

In adding the emulsifier to the water, it is preferred to prepare a concentrated soap solution in the blender tub. When using a fatty acid soap as the emulsifier, about 40 gallons of the fatty acid component, e.g., tall oil, can be dissolved in about 6 barrels of water in the tub and neutralized with a base such as sodium hydroxide. This concentrated solution is then flushed from the tub and introduced into the water tank by circulating water through the blender. Water is circulated from the tank through the blender and returned to the tank for several minutes to insure that the soap is thoroughly dispersed in the water. One batch of the concentrated soap solution for each 250 barrels of water is sufficient for most treatments. For high temperature wells, however, one batch for each 120 barrels should be used.

The water-soluble polymer can be mixed with the water by circulating water through the blender and introducing the polymer into the blender tub. For treating formations having a temperature below about 150° F, guar gum is normally used. For temperatures above 150° F, the polymer preferably is a polyacrylamide or a polyacrylamide-guar gum mixture. Proper amounts of polyacrylamide and guar gum are dispersed separately in the water and permitted to hydrate. The total concentration of the polymer in the water normally is between about ½ pound per barrel and 2 pounds per barrel of water. This concentration can be varied within the ranges previously indicated. Following introduction of the polymer into the water, the water is circulated for several minutes to insure complete hydration of the polymer, which normally requires about 30 minutes. Oil-soluble components, if used, can be added to the oil by circulating the contents of the oil tanks through the blender equipment and introducing the additive components into the blender tub.

When all of the components have been added to the liquids, the water tank and oil tank are connected to the blender manifold in such a manner that, as water flows through the manifold, oil can be introduced into the water stream at a plurality of locations to progressively increase the oil concentration in the water. The volume proportions of the water and oil entering the manifold are carefully controlled so that the fluid leaving the manifold contains the proper proportions of oil and water. The commingled oil and water streams pass successively through the blender pump and blender tub. The pump action and blender tub paddle provide sufficient agitation to form a stable emulsion.

In order to provide the proper volumetric control it has been found convenient to equalize the liquid levels in the water tank and the oil tanks and to control the discharge rates of each so that the fluid entering the blender manifold is in proportion to the volumes of fluid contained in the tanks. This, of course, assumes that the tanks are of the same dimensions. In equalizing fluid levels in the tanks, it may be necessary to transfer a small amount of oil from the oil tanks to the water tank. The oil transferred to the water tank should be thoroughly dispersed in the water by circulating the contents of the water tank through the blender for several minutes. In applications where it is necessary to equalize the tank levels, it is preferred to transfer the oil into the water tank prior to introducing the polymer. It has been found that the oil can be more easily dispersed in low viscosity water than in the viscous water containing the polymer.

With the oil and water properly treated and the tank levels equalized, the discharge of the blender is connected directly to the suction of the fracturing pumps. The flow system is then filled with the emulsion or other fluid and pressure tested in the usual manner. The initial volume of the fracturing fluid injected into the formation, known as the pad, will generally contain a fluid loss control additive such as silica flour. The silica flour is blended into the emulsion in the blender tub at a concentration of between about 20 and 40 pounds per 1,000 gallons. The pad is injected into the formation at sufficient pressures and rate to open a fracture therein. The pad volume can vary within wide limits but normally constitutes from about 25 to 50 percent of the total volume injected. Following the pad, the emulsion acting as a carrier fluid for propping agent particles is injected into the fracture. The propping agent particles can be silica sand, glass beads, walnut hulls, plastic pellets, steel shot, and the like. In most applications, however, silica sand in a concentration between about 2 pounds to 10 pounds per gallon of fluid are used. This concentration provides a multilayer pack in the fracture. For a partial monolayer pack, however, the concentration can be much lower, ranging from about 1 to about 15 pounds per barrel of fluid. The size of the propping agent particle is generally between about 6 mesh and about 60 mesh on the U. S. Standard Sieve series, with the 10–20 or 20–40 mesh size being the most common. A gradation of the propping agent particle sizes can also be used, if desired. The initial particles, for example, may have a 40–60 mesh size, followed by a 20–40 mesh size, and finally a 10–20 mesh size. Between the fluid containing the 60–60 mesh sand and the 20–40 mesh sand, a spacer fluid, that is a fluid containing no suspended solids, is normally used.

The injection rate normally is as high as practicable within the pressure limitations of the well equipment and surface facilities. Normally the injection rate will be between about 8 and 30 barrels per minute. When all of the emulsion fluid has been pumped, the emulsion in the well can be displaced into the formation by use of lease crude oil or water. The well is then shut in. As the fluid leaks off into the formation, the fracture closes on the propping agent particles. The shut in period normally ranges between 8 and 72 hours.

FIELD EXAMPLES

1. A well producing from a sandstone formation at 9,450 feet was fractured by the method of the present invention. The formation has an average temperature of 175° F, a permeability of 60 millidarcies, and a porosity of 13 percent. At the well site location, four 500 barrel tanks were connected in parallel to the manifold of an oilfield blender. The blender discharged into the suction of the fracturing pumps which were in turn connected to the wellhead. One tank was filled with about 430 barrels of public water and three tanks were filled with about 1,400 barrels of lease crude oil. The total hardness of the water was determined by the use of a commercial chemical measuring kit. Sufficient trisodium phosphate was added to the water tank to soften the water. The water was allowed to set for one-half hour to permit the water-softening chemical to react. Two batches of a concentrated soap solution were prepared in the blender tub and transferred and dispersed in the water tank. Each batch consisted of about 6 barrels of water, 40 gallons of tall oil and about 35 pounds of sodium hydroxide. Next, 250 pounds of polyacrylamide (J–201 manufactured by The Dow Chemical Company) and 350 pounds of guar gum were added to the aqueous solution. The aqueous solution containing the water-soluble additives had a pH of about 8. The liquid levels of the four tanks were equalized which required the transfer of about 28 barrels of oil from the oil tanks to the water tank. After the oil was transferred, the water tank contents were circulated to insure uniform dispersion of the oil in the water. With the tank levels equalized and following pressure testing of surface equipment, blending and pumping operations were commenced. The discharge rates of the tanks were controlled so that the tanks emptied at about the same rate, providing a blend of about 3 parts of oil to about 1 part of water by volume. Because of the 28 barrels of oil added at the start to the water, the final emulsion contained an internal oil phase of 76.5 percent and an external aqueous phase of 23.5 percent. The agitation through the blender and the injection pumps was sufficient to form a stable oil-in-water emulsion. The following injection schedule was used to fracture the well:

| Fluid (emulsion) | Vol. injected, bbls | Fluid Loss Additive Concentration, pounds/1,000 gallons | Size, mesh | Sand Concentration, lbs./gal. |
|---|---|---|---|---|
| Pad | 450 | 30 | | |
| Carrier | 48 | | 40/60 | 3 |
| Spacer | 96 | | | |
| Pad | 450 | 30 | | |
| Carrier | 48 | | 40/60 | 3 |
| Spacer | 96 | | | |
| Carrier | 168 | | 20/40 | 3 |
| Carrier | 192 | | 10/20 | 3 |
| Total Fluid Injected | 1,548 | | | |

Following fluid injection operations, the well was shut in for about 24 hours. When the well was returned to production, the fluid produced had a low viscosity, indicating that the emulsion had broken and that the polymeric thickening agent had degraded at reservoir temperature. The well cleaned up in a relatively short period of time and initially tested at about 250 barrels of oil per day. The production rate stabilized at about 125 barrels of oil per day. Prior to fracturing, the well production rate was only 10 barrels of oil per day.

2. A new well was completed in a hard sandstone formation at 8,500 feet. The formation has an average temperature of 132° F, a permeability of about 2 millidarcies and porosity of about 14 percent. The surface equipment arrangement in this well was similar to that described in Example 1 except only two 500 barrel tanks were used to contain the oil. The water tank was filled with about 500 barrels of water and the two oil tanks contained about 1,000 barrels of about 37° API crude oil. The water was softened by the addition of trisodium phosphate. About 20 gallons of ammonium hydroxide was added and dispersed in the oil. The water was also conditioned with potassium chloride. Two separate 6 barrel batches of a concentrated soap solution (sodium tallate) were mixed in the blender tub and flushed into the water tank. About 1,000 pounds of guar gum were added and dispersed in the water. The contents of the water tank were then circulated to thoroughly disperse the additives in the water. Following the pressure tests of surface equipment, injection operations were commenced. It will be noted that the oil and water combined to produce an emulsion containing about 67 volume percent of an internal oil phase and about 33 volume percent of an external water phase. The injection schedule was as follows:

| Fluid (emulsion) | Vol. injected, bbls | Fluid Loss Additive Concentration, pounds/1,000 gallons | Size, mesh | Sand Concentration, lbs./gal |
|---|---|---|---|---|
| Pad | 864 | 40 | | |
| Carrier | 96 | | 40/60 | 3 |
| Spacer | 120 | | | |
| Carrier | 240 | | 20/40 | 5 |
| Carrier | 120 | | 10/20 | 5 |
| Total Fluid Injected | 1,440 | | | |

The emulsion fluid containing the 10/20 sand was displaced from the wall conduit with about 145 barrels of water. The average injection rate was about 24 barrels per minute through the 4½ inch casing. The well was shut in overnight. When the well was placed on production, it cleaned up in a relatively short period of time and tested at 108 barrels of oil per day.

3. A pumping well was producing from a medium-hard sandstone formation at a rate of about 123 barrels of oil per day. The formation located at a depth of about 5,500 feet has an average temperature of 120° F, a permeability of 150 millidarcies, and a porosity of 16 percent. The formation was fractured by the method of the present invention employing a continuous mixing process. About 250 barrels of water from a public water supply and about 580 barrels of 20° API crude oil were placed in three 400 barrel tanks. The water was softened using 100 pounds of trisodium phosphate. About 20 gallons of ammonium hydroxide was dispersed in the oil. After the emulsifier, sodium tallate, was dispersed in the water, the tank fluid levels were equalized by transferring about 30 barrels of oil from the oil tanks to the water tank. The contents of the water tank were then circulated through the blender and returned to the water tank to thoroughly disperse the 30 barrels of oil in the water. About 500 pounds of guar gum were then dispersed in the water containing the 30 barrels of oil. During pumping operations, the oil and water were commingled and intermixed in the blender manifold and additives, e.g., fluid loss additives, and sand were blended into the stream through the blender tub. The injection schedule was as follows:

| Fluid (emulsion) | Vol. injected, bbls | Fluid Loss Additive Concentration, pounds/1,000 gallons | Size, mesh | Sand Concentration, lbs./gal |
|---|---|---|---|---|
| Pad | 286 | 40 | | |
| Carrier | 48 | | 20/40 | 3½ |
| Spacer | 48 | | | |
| Carrier | 370 | | 8/12 | 5 |
| Total Fluid Injected | 752 | | | |

The average injection rate was 10 barrels per minute through 2⅞ inch tubing. The fracturing treatment increased productivity from 123 barrels of oil per day to 300 barrels of oil per day.

4. A Gulf Coast well producing from a sandstone formation was fractured by the method of the present invention. The properties of the formation located at about 3,900 feet were as follows: temperature, 133° F; permeability, about 400 millidarcies; and porosity, 30 percent. The procedures for preparing the fluids and mixing the fluids were generally the same as those previously described. About 430 barrels of seawater were treated with about 85 gallons of a nonionic emulsifier and about 850 pounds of guar gum. The oil used as the internal phase was 980 barrels of diesel oil containing 25 gallons of ammonium hydroxide. The oil and water were mixed in a volumetric ratio to produce a water external emulsion containing about 70 percent oil and 30 percent of the aqueous polymer solution. The injection schedule was as follows:

| Fluid (emulsion) | Vol. injected, bbls | Fluid Loss Additive Concentration, pounds/1,000 gallons | Size, mesh | Sand Concentration, lbs./gal. |
|---|---|---|---|---|
| Pad | 357 | 40 | | |
| Carrier | 190 | | 70 | 4 |
| Carrier | 190 | | 8/12; 20/40 | 2 |
| Carrier | 226 | | 8/12; 20/40 | 3 |
| Total Fluid Injected | 963 | | | |

The average injection rate was 10 barrels per minute through 2⅞ inch tubing. Prior to the treatment, the well was incapable of producing. Following the treatment, the well produced at a rate of 122 barrels of oil per day.

As reflected by the field tests described above, the method of the present invention can be used to treat formations of diverse lithological properties and productivities. The method has been used with success to treat oil and gas producing formations. It has been used to treat formations as deep as 13,400 feet and as shallow as 2,140 feet and at temperatures ranging between 220° F and 98° F. It has been used to treat limestone and dolomite formations as well as sandstone formations. In all of these treatments the method lends itself for easy application using conventional fracturing equipment.

The foregoing laboratory experiments and field tests demonstrate that the fluid used in the method of this invention satisfies most of the requirements for an effective fracturing fluid. The fluid exhibits low friction loss when flowing through the tubing or casing and yet provides unusually high fluid efficiency within the fracture. The fluid is capable of suspending large quantities of large size propping agent particles. The fluid at reservoir conditions returns to a low viscosity state permitting rapid well clean-up. Finally, since the viscosity of the fluid is largely a result of the structural viscosity provided by the high concentration of the internal oil phase, less polymer than that normally used in the viscous water gels can be used resulting in a relatively low cost fracturing fluid.

I claim:

1. A method for the hydraulic fracturing of a subterranean formation penetrated by a well which comprises injecting into said formation from said well, at a pressure sufficient to open a fracture in said formation, an emulsion comprising an internal liquid hydrocarbon phase, an external aqueous phase, and a surface-active emulsifying agent capable of forming an oil-in-water emulsion, said internal liquid hydrocarbon phase comprising more than 50 but not more than about 80 volume percent of said emulsion, and said external aqueous phase containing a polymeric water thickening agent in a concentration sufficient to impart an apparent viscosity to said external aqueous phase of between 10 and 200 centipoises at 70° F and a shear rate of about 511 reciprocal seconds.

2. A method as defined in claim 1 wherein the concentration of said polymeric thickening agent in said external aqueous phase is between about 0.1 and 1.0 weight percent.

3. A method as defined in claim 2 wherein said emulsion contains an effective quantity of a particulate fluid loss control additive to decrease the tendency of said emulsion to leak off into the matrix of said formation.

4. A method as defined in claim 2 wherein said emulsion contains a minor amount of ammonium hydroxide sufficient to stabilize said emulsion.

5. A method as defined in claim 2 wherein said surface-active emulsifying agent is an ionic emulsifying agent which is deactivated in the presence of divalent ions.

6. A method as defined in claim 5 wherein said external aqueous phase comprises softened hard water.

7. A method as defined in claim 5 wherein said ionic emulsifying agent is a fatty acid soap.

8. A method as defined in claim 1 wherein the liquid hydrocarbon phase of said emulsion comprises a gas condensate.

9. A method as defined in claim 1 wherein the emulsion contains from about 60 to about 75 volume percent of said internal liquid hydrocarbon phase and from about 40 to about 25 volume percent of said external aqueous phase.

10. A method as defined in claim 1 wherein the liquid hydrocarbon phase is a crude oil produced from said formation.

11. A method as defined in claim 1 wherein the surface-active emulsifying agent is a cationic emulsifying agent.

12. A method as defined in claim 1 wherein the polymeric water thickening agent is a synthetic polymer.

13. A method as defined in claim 12 wherein the synthetic polymer is a polyacrylamide.

14. A method as defined in claim 1 wherein the polymeric water thickening agent is guar gum.

15. A method as defined in claim 1 wherein the polymeric water thickening agent comprises a natural gum and a synthetic polymer.

16. A method as defined in claim 1 wherein said liquid hydrocarbon phase has a viscosity less than about 10 centipoises at the temperature of the formation.

17. A method as defined in claim 1 wherein said surface-active emulsifying agent has an HLB number from 8 to 18.

18. A method as defined in claim 1 wherein said emulsion contains a minor amount of ammonium hydroxide sufficient to stabilize said emulsion.

19. A method of fracturing a subterranean formation surrounding a well which comprises preparing a fracturing fluid at the earth's surface by admixing a surface-active emulsifying agent capable of forming an oil-in-water emulsion and a polymeric water thickening agent in water to form thickened water having an apparent viscosity between 10 and 200 centipoises at 70° F and a shear rate of 511 reciprocal seconds, the concentration of said polymeric water thickening agent in said water being between about 0.1 and 1.0 weight percent; blending a hydrocarbon liquid into said thickened water to form an oil-in-water emulsion, said hydrocarbon liquid constituting more than 50 but not more than about 80 volume percent of the emulsion; and injecting said emulsion down said well and into said formation at a pressure sufficient to open a fracture in said formation.

20. A method for the hydraulic fracturing of a subterranean formation surrounding a well which comprises injecting into said formation an emulsion comprising from about 60 to about 75 volume percent of a hydrocarbon oil as the internal phase and from about 40 to about 25 volume percent of an aqueous solution of a surface-active emulsifying agent capable of forming an oil-in-water emulsion and a polymeric water thickening agent as the external phase, the concentration of said polymeric water thickening agent in said aqueous solution being sufficient to impart an apparent viscosity thereto of between about 10 and about 100 centipoises at 70° F and a shear rate of 511 reciprocal seconds but not exceeding 1.0 weight percent, said emulsion having an apparent viscosity of at least about 100 and not greater than about 400 centipoises at 70° F and a shear rate of 511 reciprocal seconds; and applying sufficient pressure to said emulsion to open a fracture in said formation.

21. A method for the hydraulic fracturing of a subterranean formation surrounding a well which comprises adding a surface-active emulsifying agent capable of forming an oil-in-water emulsion to a volume of water; adding to said volume of water between about 0.1 and 1.0 weight percent of a polymeric water thickening agent to form thickened water having an apparent viscosity between 10 and 200 centipoises at 70° F and a shear rate of about 511 reciprocal seconds, blending into said thickened water sufficient volume of a hydrocarbon oil to produce an oil-in-water emulsion having an apparent viscosity of at least 3 times that of said thickened water but not exceeding about 400 centipoises at 70° F and a shear rate of 511 reciprocal seconds; and injecting said emulsion into said formation at a pressure sufficient to open a fracture therein.

22. A well treating method wherein a fluid is injected into a subsurface formation at a pressure sufficient to open a fracture therein, the improvement wherein said fluid is an emulsion of hydrocarbon oil in an aqueous liquid containing a surface-active emulsifying agent capable of stabilizing the emulsion and between about 0.1 and 1.0 weight percent of a polymeric water thickening agent to impart an apparent viscosity to the aqueous liquid of between 10 and 200 centipoises at 70° F and a shear rate of about 511 reciprocal seconds, the concentration of said hydrocarbon liquid constituting more than 50 volume percent but no more than about 80 volume percent of said emulsion.

23. In the hydraulic fracturing of a subterranean mineral hydrocarbon-bearing formation penetrated by a well wherein a fracturing fluid is injected from the well into the formation at a rate and pressure sufficient 511 open a fracture in said formation, the improvement which comprises injecting as said fracturing fluid a hydrocarbon-in-water emulsion whose internal hydrocarbon phase comprises between about 60 and about 75 volume percent of said emulsion and whose external water phase contains a surface-active emulsifying agent capable of forming an oil-in-water emulsion and a polymeric water thickening agent in a concentration sufficient to impart an apparent viscosity to said external water phase of between about 10 centipoises and about 100 centipoises at 70° F and a shear rate of 522 reciprocal seconds, but not exceeding 1.0 weight percent of said external water phase.

24. A method as defined in claim 23 wherein said polymeric water thickening agent is guar gum.

25. A method as defined in claim 23 wherein said emulsion has an apparent viscosity of at least 100 but not exceeding about 400 centipoises at 70° F and a shear rate of 511 reciprocal seconds.

26. A method as defined in claim 25 in which said hydrocarbon phase has a viscosity less than about 10 centipoises at the temperature of the formation.

27. A method as defined in claim 26 in which said mineral hydrocarbon-bearing formation is a gas formation and said hydrocarbon phase comprises gas condensate.

28. A method as defined in claim 23 in which said polymeric water thickening agent is polyacrylamide.

29. A method as defined in claim 23 in which said external water phase contains softened hard water.

30. A method for treating a well which penetrates a subterranean formation which comprises injecting into said well an emulsion comprising an internal oil phase, an external aqueous phase, and a surface-active emulsifying agent capable of forming an oil-in-water emulsion, said internal oil phase comprising more than 50 but not more than about 80 volume percent of said emulsion, and said external aqueous phase containing a polymeric water thickening agent in a concentration sufficient to impart an apparent viscosity to said external aqueous phase of between 10 and 200 centipoises at 70° F and a shear rate of about 511 reciprocal seconds.

31. A method as defined in claim 30 wherein said polymeric water thickening agent is guar gum.

32. A method as defined in claim 30 wherein the polymeric water thickening agent is polyacrylamide.

33. A method for the hydraulic fracturing of a subterranean formation penetrated by a well which comprises injecting into said formation from said well an emulsion comprising an internal liquid hydrocarbon phase, an external aqueous phase, and an ionic emulsifying agent which is deactivated in the presence of divalent ions, said internal liquid hydrocarbon phase comprising more than 50 but not more than about 80 volume percent of said emulsion, and said external aqueous phase containing a polymeric water thickening agent in a concentration sufficient to impart an apparent viscosity to said external aqueous phase of between 10 and 200 centipoises at 70° F and a shear rate of about 511 reciprocal seconds; applying sufficient pressure to said emulsion to open a fracture in said formation.

34. A method as defined in claim 33 wherein said ionic emulsifying agent is a fatty acid soap.

* * * * *